United States Patent [19]

Claas et al.

[11] Patent Number: 5,078,646
[45] Date of Patent: Jan. 7, 1992

[54] SELF-PROPELLING HARVESTER THRESHER

[75] Inventors: Helmut Claas; Franz Tophinke; Franz Heidjann, all of Harsewinkel, Fed. Rep. of Germany

[73] Assignee: CLAAS OHG, Harsewinkel, Fed. Rep. of Germany

[21] Appl. No.: 574,297

[22] Filed: Aug. 28, 1990

[30] Foreign Application Priority Data

Sep. 28, 1989 [DE] Fed. Rep. of Germany ....... 3932370

[51] Int. Cl.⁵ ................................................ A01F 7/06
[52] U.S. Cl. .......................................... 460/69; 460/70
[58] Field of Search ..................... 460/66, 63, 69, 70, 460/75, 76, 77

[56] References Cited

U.S. PATENT DOCUMENTS

| | | |
|---|---|---|
| 4,291,709 | 9/1981 | Weber et al. ................... 460/70 |
| 4,741,349 | 5/1988 | Roderfeld et al. .............. 460/66 |
| 4,875,890 | 10/1989 | Margerum et al. ............. 460/66 |
| 4,884,994 | 12/1989 | Hall et al. ....................... 460/66 |
| 4,986,794 | 1/1991 | Ricketts ......................... 460/69 |

Primary Examiner—Terry L. Melius
Attorney, Agent, or Firm—Michael J. Striker

[57] ABSTRACT

A self-propelling harvesting thresher comprises threshing means, and a post threshing and separating mechanism, the post threshing and separating mechanism operating in accordance with an axial flow system and including two rotors located near one another and driven in the same direction and a housing surrounding the rotors and provided with guiding means above each drum for guiding a product, the housing being expanded above the rotors.

6 Claims, 3 Drawing Sheets

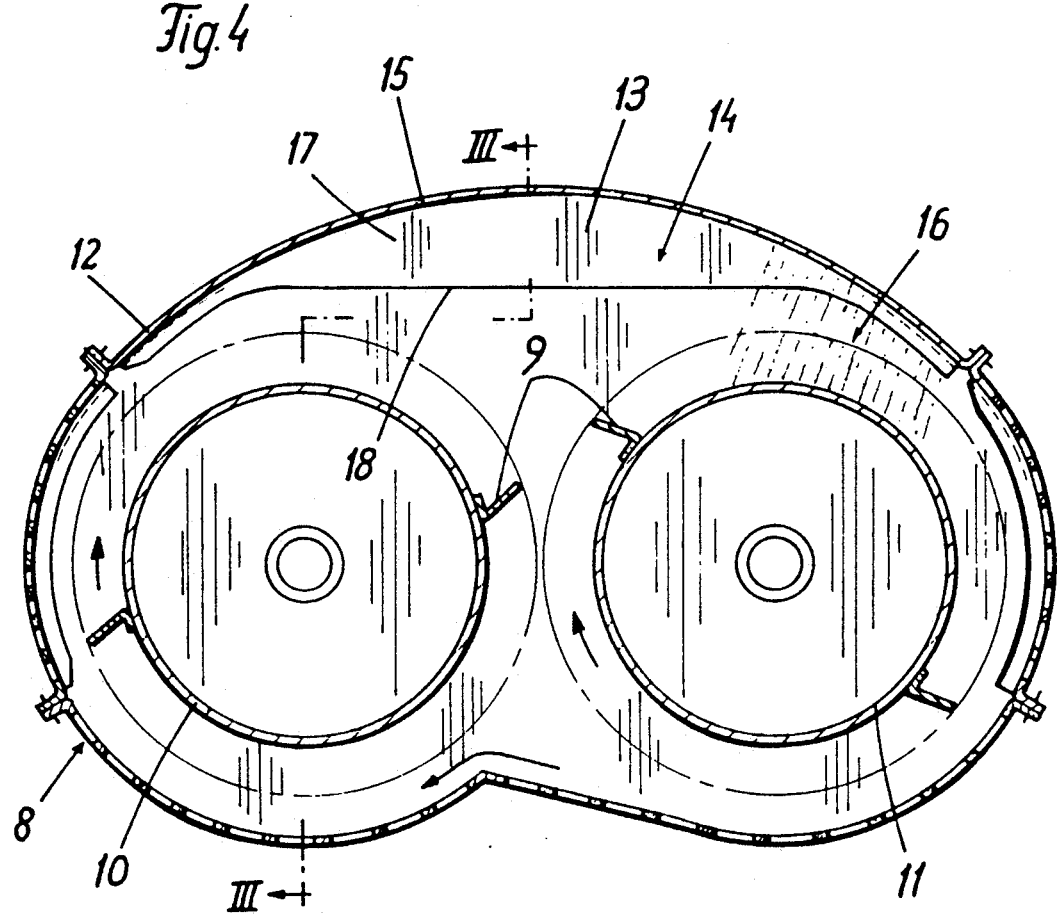

SELF-PROPELLING HARVESTER THRESHER

BACKGROUND OF THE INVENTION

The present invention relates to a self-propelling harvester thresher with a post threshing and separating mechanism which operates in accordance with the axial flow system and includes two rotors rotating in the same direction and surrounded by a housing provided with guiding means for guiding a harvested product.

A harvester thresher of the above mentioned general type is known in the art. One of such harvester threshers is disclosed for example in the German document DE PS 3,023,756. The disadvantage of such harvester threshers with the threshing and separating devices operating in accordance with the axial flow system is that they do not completely guarantee satisfactory residual grain separation. It is believed to be clear that such harvester threshers can be improved in these particular aspects.

SUMMARY OF THE INVENTION

Accordingly, it is an object of the present invention to provide a harvester thresher of the above mentioned general type, which avoids the disadvantages of the prior art.

More particularly, it is an object of the present invention to provide a harvester thresher of the above mentioned type which satisfies the requirement to provide as complete as possible residual grain separation from a straw mat.

In keeping with these objects and with others which will become apparent hereinafter, one feature of the present invention resides, briefly stated, in a self-propelling harvester thresher in which the housing which surrounds the rotors is expanded above the rotors.

As a result, a chamber is produced above the rotor, into which the straw supplied by one of the rotors can be expanded before being engaged by the second rotor.

When the harvester thresher is designed in accordance with these features, the residual grains located in the center of the straw mat can travel outwardly.

In accordance with another advantageous feature of the present invention, the upper wall part of the housing is formed in an arcuate shape. Therefore it does not have any corners or edges for jamming the straw mat.

Still another advantageous feature of the present invention is that the upper wall part is formed so that a relatively great drawing-in wedge is formed between the rotor which engages the expanded product and the wall part.

For insuring a good guidance of the straw in the expansion chamber, the height of the guiding strips of the guiding means above the rotors substantially corresponds to the height of the expansion chamber.

In accordance with a further feature of the present invention, the upper limit of each guiding strip extends at a distance from the outer surface of the rotors, which corresponds substantially to the distance between the outer surface or the rotors and the lateral limiting wall parts of the housing.

For providing a uniform shape of the rotor housing, the guiding strips in the region above the rotors can be formed as circular segments.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawings.

BRIEF DESCRIPTION OF THE DRAWINGS

FIG. 4 is a view showing a section taken along the line IV—IV in FIG. 2.

DESCRIPTION OF THE PREFERRED EMBODIMENT

Figure 1:
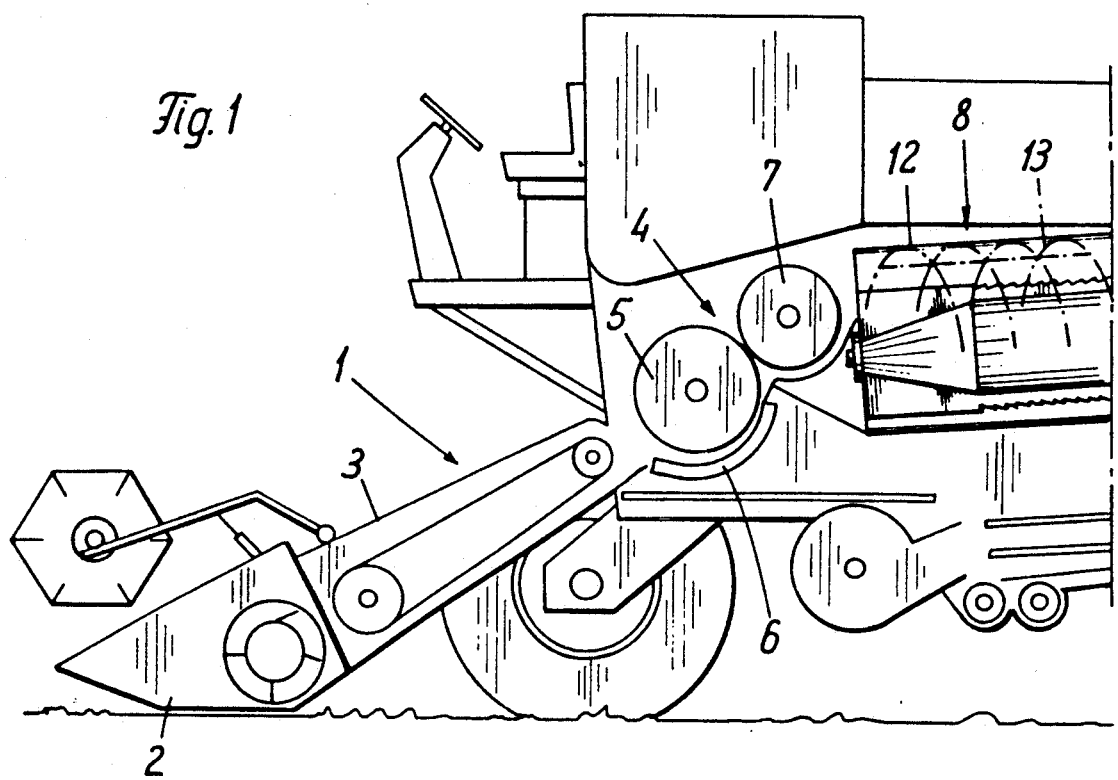
FIG. 1 is a view showing a front part of the self-propelling harvester thresher.
Figure 2:
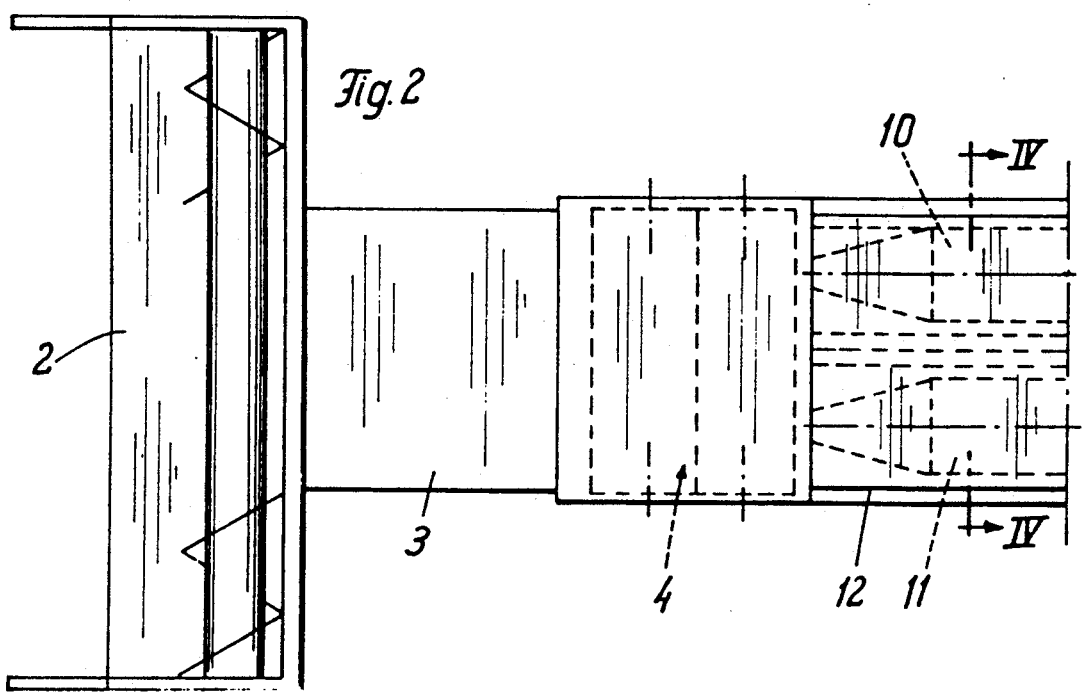
FIG. 2 is a plan view of the harvester thresher of FIG. 1.
Figure 3:
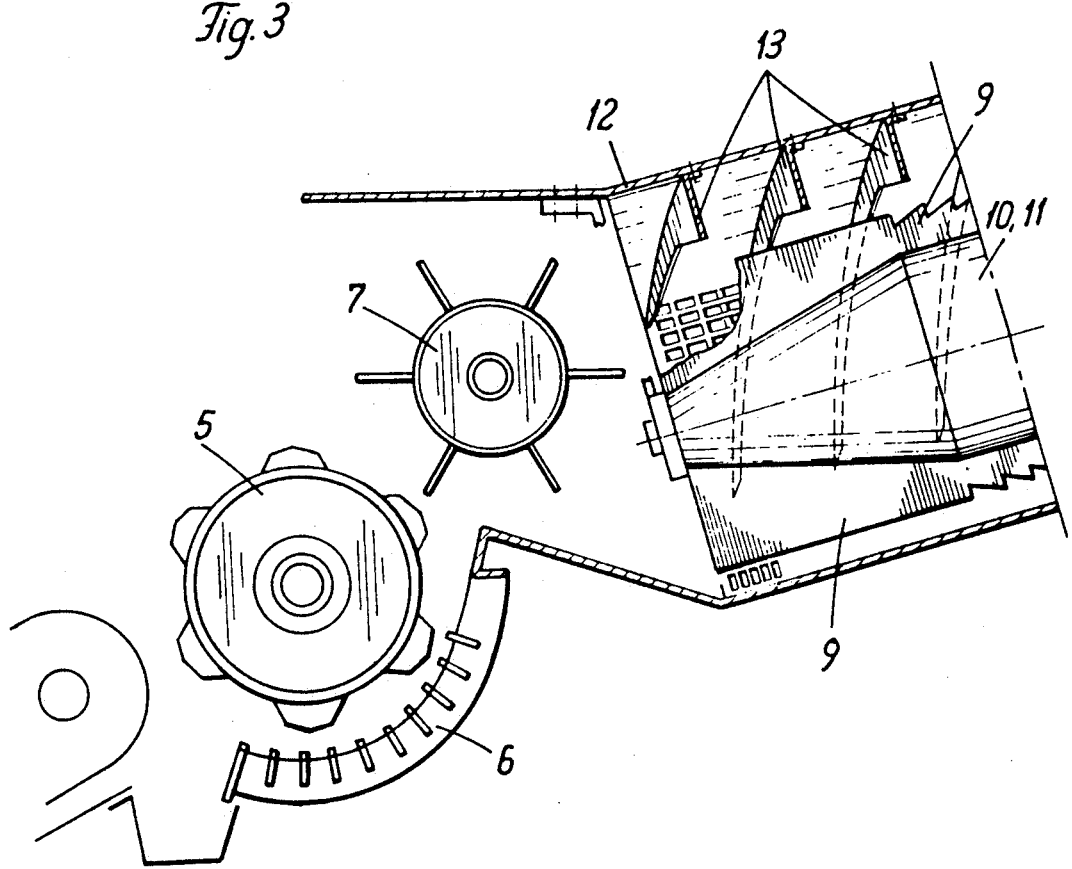
FIG. 3 is a part of the harvester thresher shown in FIG. 1 on an enlarged scale in a partial perspective showing.

A front part of a self-propelling harvester thresher in accordance with the present invention is identified as a whole with reference numeral 1. In a known manner it is provided with a front cutting trough 2 and an inclined transporting passage 3 connected therewith. A tangential threshing mechanism 4 is located after the inclined transporting passage and includes a threshing drum 5 and a threshing basket 6 associated with the threshing drum. A transfer drum 7 follows the threshing mechanism 4.

A post threshing and separating device 8 is located further downstream in the harvester thresher. It operates in accordance with the axial flow system and includes substantially two rotors 10 and 11 running to one another in a travelling direction and provided with strips 9. In the product receiving region the rotors are formed as truncated cones. Both rotors are driven in a clockwise direction and are surrounded by a common housing 12 which is perforated in some areas. For transporting the product stream, the housing 12 is provided in its interior with guiding strips 13 which are fixed to the housing. The guiding strips 13 are located at a distance from one another and inclined rearwardly opposite to the travelling direction.

As can be seen from FIG. 4, the housing 12 is expanded in the upper region so that a chamber 14 is formed above the rotors 10 and 11. The upper wall part 15 of the housing 12 extends over a great arc so that between the rotor 11 and the wall part 15 a great inlet wedge 16 is formed. The guiding strips 13 expand in form of a circular segment 17 with a cord 18 located at a small distance above the outer circle of the rotors 10 and 11.

A harvested product separated by the cutting trough 2 is transported through the inclined transporting passage 3 to the tangential threshing mechanism 4 and threshed there. The greater part of the threshed out straw is supplied then by the transfer drums 7 at the end side to the post threshing and separating device 8. The product stream is transported by the guiding strips 13 of the housing 12 to the rotors 10 and 11 of the post threshing and separating device 8. The product thrown by the left rotor 10 can be expanded into the chamber 14 above the rotors 10 and 11 and then engaged by the right rotor 11 and again compressed. Due to this operation the residual drain separation is substantially improved, since the residual grain located in the interior of the transported straw mat can move outwardly. Due to the greater inlet wedge 16 the drawing of the expanded straw mat through the rotor 11 is insured. A reliable guidance of the straw mat through the expansion chamber 14 is insured by the expansion of the guiding strips 13 in form of the circular segment 17 with the cord located at a distance above the rotors 10 and 11.

It will be understood that each of the elements described above, or two or more together, may also find a useful application in other types of constructions differing from the types described above.

While the invention has been illustrated and described as embodied in a self-propelling harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelling harvesting thresher, comprising threshing means; and a post threshing and separating mechanism, said post threshing and separating mechanism operating in accordance with an axial flow system and including two rotors located near one another and driven in the same direction; and a single housing having a continuous convex shaped upper surface surrounding both said rotors and provided with guiding means extending across said upper surface above both rotors for guiding a product, said housing being expanded above said rotors so that a product thrown by one of said rotors can expand above said rotors and then can be engaged by the other of said rotors.

2. A self-propelling harvester thresher as defined in claim 1, wherein said housing has an upper wall part which extends upwardly in an arcuate shape.

3. A self-propelling harvester thresher as defined in claim 2; and further comprising an inlet wedge formed between one of said rotors and said wall part and improving a product drawing.

4. A self-propelling harvester thresher as defined in claim 1, wherein said housing is expanded so that to form an expansion member above said rotors, said guiding means including guiding strips located above said rotors substantially at a height of said expansion chamber.

5. A self-propelling harvester thresher as defined in claim 4, wherein each of said guiding strips has a lower edge located above said rotors at a distance relative to their outer surface, said distance substantially corresponding to a distance between said outer surface of said rotors and lateral walls of said housing.

6. A self-propelling harvester thresher as defined in claim 4, wherein said guiding strips in the region located above said rotors is formed as a circular segment.

* * * * *